United States Patent
Liu et al.

(10) Patent No.: US 9,098,769 B2
(45) Date of Patent: Aug. 4, 2015

(54) METHOD AND A DEVICE FOR OBJECTS COUNTING

(71) Applicant: NEC (China) Co., Ltd., Beijing (CN)

(72) Inventors: Guoyi Liu, Beijing (CN); Shaopeng Tang, Beijing (CN); Hongming Zhang, Beijin (CN); Feng Wang, Beijing (CN); Wei Zeng, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 205 days.

(21) Appl. No.: 13/743,026

(22) Filed: Jan. 16, 2013

(65) Prior Publication Data

US 2013/0251197 A1  Sep. 26, 2013

(30) Foreign Application Priority Data

Mar. 21, 2012  (CN) .......................... 2012 1 0076888

(51) Int. Cl.
 *G06K 9/00* (2006.01)
 *G06K 9/32* (2006.01)
 *G06T 7/20* (2006.01)

(52) U.S. Cl.
 CPC .......... *G06K 9/3241* (2013.01); *G06K 9/00785* (2013.01); *G06T 7/20* (2013.01); *G06T 2207/10028* (2013.01); *G06T 2207/20148* (2013.01); *G06T 2207/30241* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 7,860,162 | B2 * | 12/2010 | Yokomitsu et al. | 375/240.12 |
| 8,199,215 | B2 * | 6/2012 | Phelippeau et al. | 348/222.1 |
| 8,606,014 | B2 * | 12/2013 | Matsuda | 382/195 |
| 2005/0100213 | A1 * | 5/2005 | Qi et al. | 382/170 |

(Continued)

FOREIGN PATENT DOCUMENTS

| | | |
|---|---|---|
| CN | 102184409 A | 9/2011 |
| WO | WO 2005050581 A2 * | 6/2005 |
| WO | WO 2012023639 A1 * | 2/2012 |

OTHER PUBLICATIONS

Oosterhout,T., et al. "Head Detection in Stereo Data for People Counting and Segmentation" Proceedings of the Sixth International Conference on Computer Vision Theory and Applications. Mar. 2011. (6 Pages).

(Continued)

*Primary Examiner* — Jayesh A Patel
*Assistant Examiner* — Mai Tran
(74) *Attorney, Agent, or Firm* — Tutunjian & Bitetto, P.C.

(57) ABSTRACT

A method and a device for objects counting in image processing includes acquiring the depth image of any one frame; detecting objects according to the depth image; associating the identical object in different frames to form a trajectory; and determining the number of objects according to the number of trajectories. The devices include an acquisition module for acquiring the depth image of any one frame; a detection module for detecting objects according to the depth image; an association module for associating the identical object in different frames to form a trajectory; a determining module for determining the number of objects according to the number of trajectories. The objects are detected according to the depth image. The identical object in different frames is associated to form a trajectory and the number of objects is determined according to the number of trajectories.

19 Claims, 4 Drawing Sheets

(56) References Cited

U.S. PATENT DOCUMENTS

| | | | |
|---|---|---|---|
| 2006/0269103 A1* | 11/2006 | Brown et al. | 382/103 |
| 2011/0091074 A1* | 4/2011 | Nobori et al. | 382/103 |
| 2011/0286633 A1* | 11/2011 | Wang et al. | 382/103 |
| 2013/0136307 A1* | 5/2013 | Yu et al. | 382/103 |

OTHER PUBLICATIONS

Wikipedia. "Mean-shift" Nov. 2012. http://en.wikipedia.org/w/index.php?title=Mean-shift&oldid=521489778.

* cited by examiner

METHOD AND A DEVICE FOR OBJECTS COUNTING

TECHNICAL FIELD

The present invention relates to the field of image processing, and more particularly, to a method and a device for objects counting.

BACKGROUND OF THE INVENTION

Automatically counting the objects passing through a given area has been widely used. Particularly for counting people, at the entrances and exits of passages and other major surveillance areas, people counting can provide real-time, visualized, and accurate passenger flow data for management in areas where flow control is needed, such as, subways and railway stations, etc. People counting can provide effective support for controlling the passenger flow. In addition, related commercial analysis and data mining based on accurate people counting can be conducted for shopping centers and franchises to help the management manage the market and make business decisions.

At present, objects are usually counted based on the color image in the regular video, the main process of which is as follows:

first, extracting the position of each object based on the color image in the regular video to detect the object; next, associating the identical object in different frames to form a trajectory; finally, determining the number of objects according to the number of trajectories. Wherein, there are many methods for extracting the positions of objects based on the color image of the regular video, for example, the method based on background subtraction, which extracts the objects by performing differential operation on the color image and the background.

During the process of realizing the present invention, the inventor found at least the following problems in the prior art:

In the prior art, objects are usually counted based on the color image of regular video, however, the regular video is greatly affected by the external conditions such as the installation environment of the camera, the illumination variation, and the difference of the clothing of objects, and thus results in a great difference among the results of objects counting in different environments, and it is difficult to meet the demands for high-accuracy objects counting in various environments.

BRIEF SUMMARY OF THE INVENTION

To solve the existing technical problems, a method and a device for objects counting are provided in the embodiments of the present invention. The technical solutions are as follows:

One objective of the present invention is to provide a method for objects counting. Said method comprises:

acquiring the depth image of any one frame;

detecting objects according to said depth image;

associating the identical object in different frames to form a trajectory;

determining the number of objects according to the number of trajectories.

In another embodiment, said detecting objects according to said depth image comprises:

computing the distance from a camera to the ground according to said depth image;

converting said depth image into a height image starting from the ground according to said distance;

performing threshold division on said height image to obtain at least one foreground region set; and identifying objects from said at least one foreground region set according to a preset reference region.

In another embodiment, said performing threshold division on said height image to obtain at least one foreground region set comprises:

setting a threshold for dividing an image, defining the regions in the height image of which the height is greater than or equal to said threshold as the foreground regions, forming said foreground regions to a foreground region set;

said identifying objects from said at least one foreground region set according to a preset reference region comprises:

selecting at least one foreground region from said foreground region set according to the size and contour of said reference region, defining said selected at least one foreground region as the object, wherein the difference between each of said selected at least one foreground region and said reference region is less than or equal to a preset range.

In another embodiment, said performing threshold division on said height image to obtain at least one foreground region set comprises:

setting a first threshold and a second threshold for dividing an image, defining the regions in the height image of which the height is greater than or equal to said first threshold as the first foreground regions, forming said first foreground regions to a first foreground region set, defining the regions in the height image of which the height is greater than or equal to said second threshold as the second foreground regions, forming said second foreground regions to a second foreground region set;

said identifying objects from said at least one foreground region set according to a preset reference region comprises:

selecting at least one foreground region from said first foreground region set and said second foreground region set according to the size and contour of said reference region, defining said selected at least one foreground region as the object, wherein the difference between each of said selected at least one foreground region and said reference region is less than or equal to a preset range, whereby when a foreground region from said first foreground set and a foreground region from said second foreground set are at the same position and the difference between each of both foreground regions and said reference region is less than or equal to a preset range, selecting the foreground region that has the least difference from said reference region and defining said selected foreground region as the object.

In another embodiment, when said selected at least one foreground region includes a plurality of objects, before defining said selected at least one foreground region as the object, said method further comprises:

for each pixel in said at least one foreground region, in a preset window centered on the pixel, computing the mean height value of each pixel in said window, moving the center of said window to the position of the mean height value, repeating the computation and movement processes until the mean height value of said window at the current position is equal to that of said window at the previous position, defining the current position of said window as the position of an object;

wherein, said computation and movement processes are used for computing the mean height value of each pixel in said window and moving the center of said window to the position of the mean height value.

In another embodiment, said associating the identical object in different frames to form a trajectory comprises:

predicting the position of the object in each frame, and storing the predicated position information of the object in each frame in a first set as an element;

storing the position information of the detected object in each frame in a second set as an element;

associating the elements in said first set and the elements in said second set to form trajectories.

In another embodiment, said predicting the position of the object in each frame comprises:

based on the first position of the detected object in the current frame, in a preset range centered on a second position in the next frame, selecting a region of which the size is identical with that of the region where said object is located, comparing the color image of the selected region with the color image of the region where said object is located for a degree of similarity;

defining the selected region of which the degree of similarity is higher than a certain threshold as the position of said object in the next frame;

wherein, the position of said second position in said next frame is identical with that of said first position in said current frame.

In another embodiment, said associating the elements in said first set and the elements in said second set to form trajectories comprise:

for a first element in said first set, when a second element of which the position information matches that of said first element within a preset range is found in said second set, adding said second element to the trajectory, when said second element of which the position information matches that of said first element with in a preset range is not found in said second set, adding said first element to said trajectory;

for a third element in said second set, when a fourth element of which the position information matches that of said third element within a preset range is not found in said first set, adding said third element to a new trajectory.

In another embodiment, after said adding said first element to said trajectory, said method further comprises:

increasing the mark value of said trajectory, ending said trajectory when the mark value of said trajectory is greater than a preset threshold.

In another embodiment, after said adding said third element to a new trajectory, said method further comprises:

setting up the state of said new trajectory as non-active, when the number of elements in said new trajectory is greater than a preset threshold, setting up the state of said new trajectory as active.

In another embodiment, after said associating the identical object in different frames to form a trajectory, said method further comprises:

displaying the trajectories corresponding to different objects using different colors.

Another objective of the embodiments of the present invention is to provide a device for objects counting. Said device comprises:

an acquisition module for acquiring the depth image of any one frame;

a detection module for detecting objects according to said depth image;

an association module for associating the identical object in different frames to form a trajectory;

a determining module for determining the number of objects according to the number of trajectories.

In another embodiment, said detection module comprises:

a computation unit for computing the distance from the camera to the ground according to said depth image;

a conversion unit for converting said depth image into a height image starting from the ground according to said distance;

a division unit for performing threshold division on said height image to obtain at least one foreground region set;

an identifying unit for identifying objects from said at least one foreground region set according to a preset reference region.

In another embodiment, said division unit is specifically used for:

setting a threshold for dividing an image, defining the regions in the height image of which the height is greater than or equal to said threshold as the foreground regions, forming said foreground regions to a foreground region set;

said identifying unit is specifically used for selecting at least one foreground region from said foreground region set according to the size and contour of said reference region, defining said selected at least one foreground region as the object, wherein the difference between each of said selected at least one foreground region and said reference region is less than or equal to a preset range.

In another embodiment, said division unit is specifically used for:

setting a first threshold and a second threshold for dividing an image, defining the regions in the height image of which the height is greater than or equal to said first threshold as the first foreground regions, forming said first foreground regions to a first foreground region set, defining the regions in the height image of which the height is greater than or equal to said second threshold as the second foreground regions, forming said second foreground regions to a second foreground region set;

said identifying unit is specifically used for:

selecting at least one foreground region from said first foreground region set and said second foreground region set according to the size and contour of said reference region, defining said selected at least one foreground region as the object, wherein the difference between each of said selected at least one foreground region and said reference region is smaller than or equal to a preset range, whereby when a foreground region from said first foreground set and a foreground region from said second foreground set are at the same position and the difference between each of both foreground regions and said reference region is smaller than or equal to a preset range, selecting the foreground region that has the least difference from said reference region and defining said selected foreground region as the object.

In another embodiment, when said selected at least one foreground region includes a plurality of objects, before defining said selected at least one foreground region as the object, said identifying unit is also used for:

for each pixel in said at least one foreground region, in a preset window centered on the pixel, computing a mean height value of each pixel in said window, moving the center of said window to the position of the mean height value, repeating the computation and movement processes until the mean height value of said window at the current position is equal to that of said window at the previous position, defining the current position of said window as the position of an object;

wherein, said computation and movement processes are used for computing the mean height value of each pixel in said window and moving the center of said window to the position of the mean height value.

In another embodiment, said association module comprises:

a predication unit for predicting the position of the object in each frame, and storing the predicated position information of the object in each frame in a first set as an element;

a detection unit for storing the position information of the detected object in each frame in a second set as an element;

an association unit for associating the elements in said first set and the elements in said second set to form trajectories.

In another embodiment, when predicting the position of the object in each frame, said prediction unit is specifically used for:

based on the first position of the detected object in the current frame, in a preset range centered on a second position in the next frame, selecting a region of which the size is identical with that of the region where said object is located, comparing a color image of the selected region with a color image of the region where said object is located for the degree of similarity;

defining the selected region of which the degree of similarity is higher than a certain threshold as the position of said object in the next frame;

wherein, the position of said second position in said next frame is identical with that of said first position in said current frame.

In another embodiment, said association unit is specifically used for:

for a first element in said first set, when a second element of which the position information matches that of said first element within a preset range is found in said second set, adding said second element to the trajectory, when said second element of which the position information matches that of said first element within a preset range is not found in said second set, adding said first element to said trajectory;

for a third element in said second set, when a fourth element of which the position information matches that of said third element within a preset range is not found in said first set, adding said third element to a new trajectory.

In another embodiment, after said adding said first element to said trajectory, said association unit is also used for:

increasing a mark value of said trajectory, and ending said trajectory when the mark value of said trajectory is greater than a preset threshold.

In another embodiment, after said adding said third element to a new trajectory, said association unit is also used for:

setting up a state of said new trajectory as non-active, when the number of elements in said new trajectory is greater than a preset threshold, and setting up the state of said new trajectory as active.

In another embodiment, said device further comprises: a display module for displaying the trajectories corresponding to different objects using different colors.

The technical solutions provided in the embodiments of the present invention have the following advantages:

In the present embodiments, the objects are detected according to the depth image, the identical object in different frames is associated to form a trajectory and the number of objects is determined according to the number of trajectories. The depth data are highly consistent and are not easily affected by the environment, therefore counting objects based on the depth data ensures a more stable and accurate detection result. In addition, the position is predicted using the texture and color information of the object; therefore, the prediction result is more accurate compared with that of predicting the position using the position information only.

BRIEF DESCRIPTION OF THE SEVERAL VIEWS OF THE DRAWINGS

The present invention will become more fully understood from the accompanying drawings as below. However, these drawings are only exemplary. Still further variations can be readily obtained by one skilled in the art without burdensome and/or undue experimentation. Such variations are not to be regarded as a departure from the spirit and scope of the invention.

DETAILED DESCRIPTION OF THE INVENTION

To clarify the objectives, technical solutions, and advantages of the present invention, the embodiments of the present invention are further described in detail with reference to the attached drawings.

Figure 1:
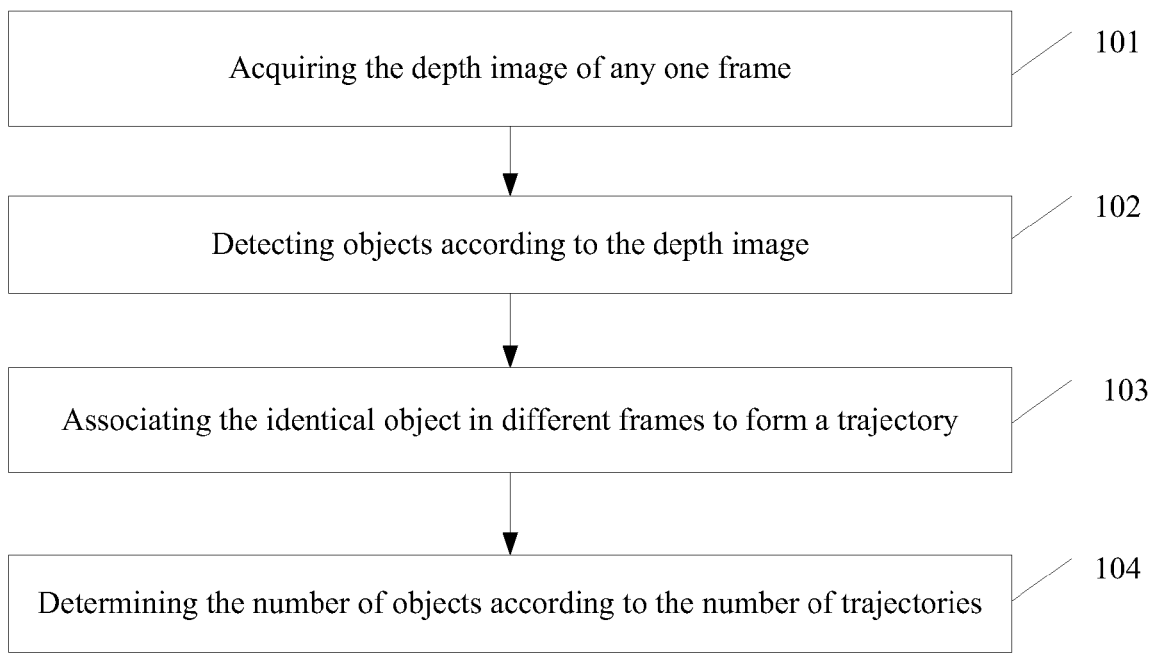
FIG. 1 shows a flow chart of a method for objects counting provided in one embodiment of the present invention.

Referring to FIG. 1, a method for objects counting is provided in the present embodiment of the present invention. The method comprises:

101: acquiring a depth image of any one frame;

102: detecting objects according to the depth image;

103: associating the identical object in different frames to form a trajectory;

104: determining the number of objects according to a number of trajectories.

In the present embodiment, the objects are detected according to the depth image, the identical object in different frames is associated to form a trajectory and the number of objects is determined according to the number of trajectories. The depth data are highly consistent and are not easily affected by the environment, therefore counting objects based on the depth data ensures a more stable and accurate detection result.

Figure 2:
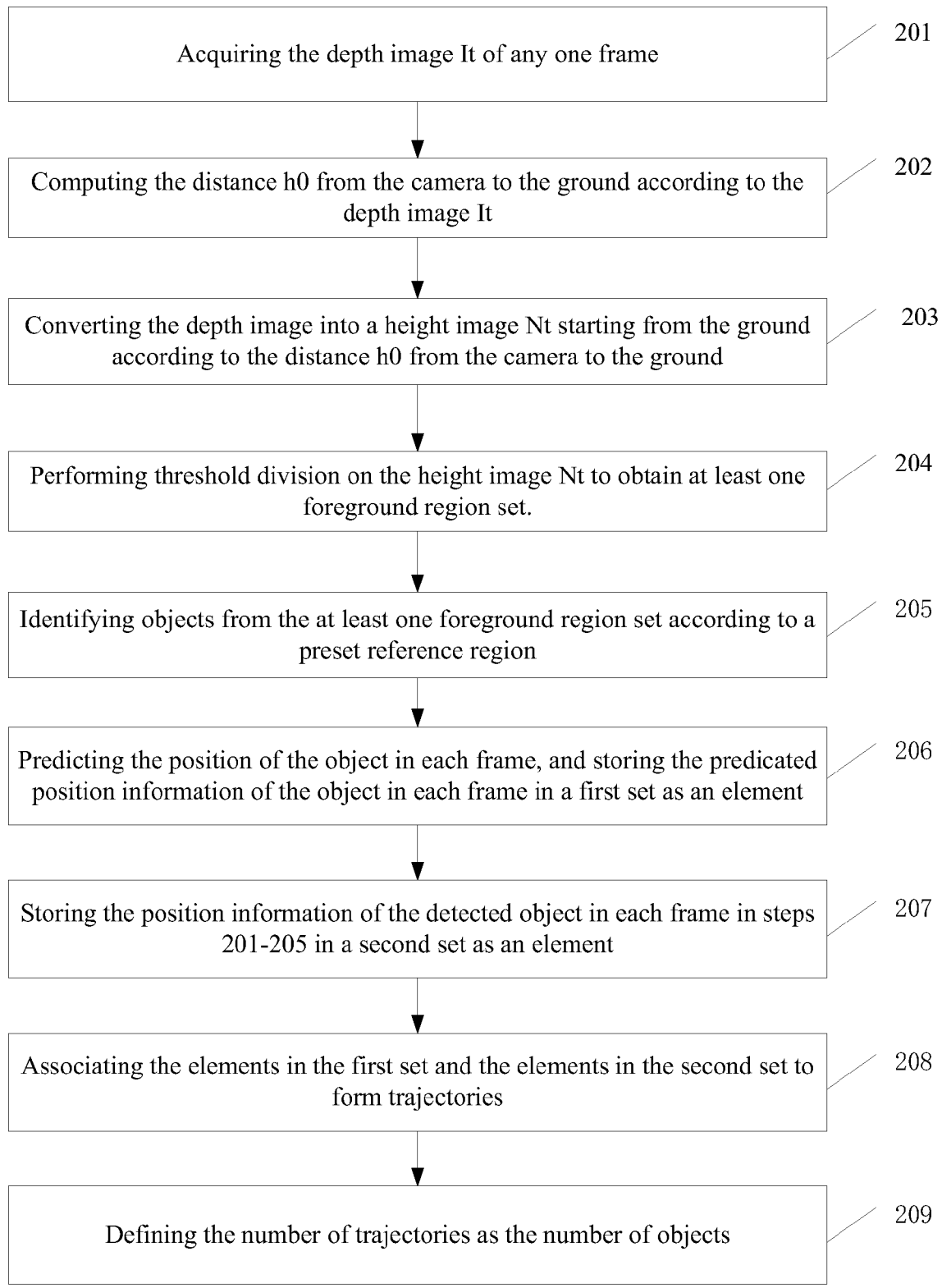
FIG. 2 shows a flow chart of a method for objects counting provided in another embodiment of the present invention.

Referring to FIG. 2, a method for counting objects is also provided in the present embodiment. The method comprises:

201: acquiring the depth image It of any one frame;

Wherein, any pixel It(x,y) in the depth image It represents: the distance from the object to the camera in a direction vertical to the ground corresponding to the pixel It(x,y) to the camera in the direction vertical to the ground.

Wherein, the depth image can be acquired by many approaches. For example, the depth image can be acquired by the Kinect depth sensor, infrared laser projection technology or binocular stereoscopic vision technology, etc.

202: computing the distance h0 from the camera to the ground according to the depth image It;

specifically, defining the pixel with the maximum depth value in the depth image It as the distance h0 from the camera to the ground. The formula is as follows:

$$h0 = \text{Max}(It(x,y))$$

Wherein, h0 represents the distance from the camera to the ground; It(x,y) represents any pixel in the depth image It; Max represents maximizing the value.

203: converting the depth image into a height image Nt starting from the ground according to the distance h0 from the camera to the ground;

specifically, subtracting the distance from the camera to the ground by the depth image to obtain a height image. The formula is as follows:

$$Nt(x,y) = h0 - It(x,y)$$

Wherein, Nt(x,y) represents any pixel in the height image Nt; h0 represents the distance from the camera to the ground; and It(x,y) represents any pixel in the depth image It.

204: performing threshold division on the height image Nt to obtain at least one foreground region set.

According to the number of the thresholds, a single threshold division method and a double-threshold division method are provided in the present embodiment.

The single threshold division method refers to setting a threshold for dividing an image, defining the regions in the height image of which the height is greater than or equal to the threshold as the foreground regions, and forming the foreground regions to a foreground region set. The formula is as follows:

$$Tt = \begin{cases} 1, & (Nt(x, y) \geq h) \\ 0, & (Nt(x, y) < h) \end{cases}$$

wherein, h represents the threshold value for dividing the image; Nt(x,y) represents any pixel in the height image Nt; and Tt represents the foreground regions when it is 1.

It should be noted that if the object to be detected is a person, the threshold is obtained by subtracting the height of the person by the length of his/her head. For example, if the height of a person is 1.75 m tall, and the length of his/her head is 0.2 m, so the threshold h=1.75−0.2=1.55 m.

A double-threshold division method refers to setting a first threshold and a second threshold for dividing the image, defining the regions in the height image of which the height is greater than or equal to the first threshold as the first foreground regions, forming the first foreground regions to a first foreground region set; defining the regions in the height image of which the height is greater than or equal to the second threshold as the second foreground regions, and forming second foreground regions to a second foreground region set.

The formula is as follows:

$$Tt1 = \begin{cases} 1, & (Nt(x, y) \geq h1) \\ 0, & (Nt(x, y) < h1) \end{cases},$$

$$Tt2 = \begin{cases} 1, & (Nt(x, y) \geq h2) \\ 0, & (Nt(x, y) < h2) \end{cases}$$

wherein, h1 represents the first threshold for dividing an image; Nt(x,y) represents any pixel in the height image Nt; Tt1 represents the first foreground regions when it is 1; h2 represents the second threshold for dividing the image; and Tt2 represents the second foreground regions when it is 1.

It should be noted that if the object to be detected is a person, the first and second thresholds are respectively obtained by subtracting the height of the person by the length of his/her head. For example, providing that the height of a person is usually 1.75-1.95 m, and the length of the head is usually 0.2 m, so the first threshold is h1=1.75−0.2=1.55 m, and the second threshold is .h2=1.95−0.2=1.75 m.

205: identifying objects from the at least one foreground region set according to a preset reference region.

The single threshold division method includes: selecting at least one foreground region from the foreground region set according to the size and contour of the reference region, defining the selected at least one foreground region as the object, wherein the difference between each of the selected at least one foreground region and the reference region is smaller than or equal to a preset range;

or, the double-threshold division method includes: selecting at least one foreground region from the first foreground region set and the second foreground region set according to the size and contour of the reference region, defining the selected at least one foreground region as the object, wherein the difference between each of the selected at least one foreground region and the reference region is smaller than or equal to a preset range, whereby when a foreground region from the first foreground set and a foreground region from the second foreground set are at the same position and the difference between each of both foreground regions and the reference region is smaller than or equal to a preset range, selecting the foreground region that has the least difference from the reference region and defining the selected foreground region as the object. As the preferable detection result is selected from the two sets by the double-threshold division method, the detection result is more accurate.

The following description uses a human as an example, wherein the head reference region can be preset, and the heads of people are determined from the at least one foreground region set:

for a single threshold division method, selecting at least one foreground region from the foreground region set obtained by the single threshold division according to the size and contour of the reference region, defining the selected at least one foreground region as the object, wherein the difference between each of the selected foreground region and the head reference region is smaller than or equal to a preset range, namely selecting the foreground regions close to the head reference region as the detection results of the heads of people;

for a double-threshold division method: selecting at least one foreground region from the first foreground region set and the second foreground region set according to the size and contour of the reference region, defining the selected at least one foreground region as the detection result of the heads of people, wherein the difference between each of the selected foreground region and the head reference region is smaller than or equal to a preset range; whereby, when a foreground region from the first foreground set and a foreground region from the second foreground set are at the same position and the difference between each of both foreground regions and the head reference region is smaller than or equal to a preset range, selecting the region that has the least difference from the head reference region and defining the selected region as the detection result of head of people, namely selecting the optimal foreground region close to the head reference region as the detection result of the heads of the group of people.

Furthermore, when the selected at least one foreground region includes a plurality of objects, before defining the selected at least one foreground region as the object in the above mentioned description, the mean-shift algorithm (also called hill-climbing algorithm) can be adopted to determine the objects, which specifically comprises:

for each pixel in the at least one foreground region, in a preset window centered on the pixel, computing the mean height value of each pixel in the window, moving the center of the window to the position of the mean height value, repeating the computation and movement processes until the mean height value of the window at the current position is equal to that of the window at the previous position, which means that the window will not move; and defining the current position of the window as the position of the object, namely defining the position of the window in the stable state as the position of the object; wherein the computation and movement processes are used for computing the mean height value of each pixel in the window and moving the center of the window to the position of the mean height value. Wherein, the mean height value is a weighted coordinate value, computed by weighting the coordinate values of each pixel in the window by the corresponding height values. The position of the mean height value is also the center of gravity of the window.

The above mentioned mean-shift algorithm is suitable for detecting objects with hill shapes, such as the detection of the heads of people.

206: predicting the position of the object in each frame, and storing the predicated position information of the object in each frame in a first set as an element.

The following two methods can be adopted to predict the position of the object in each frame.

The first method comprises: based on the first position of the detected object in the current frame, in a preset range centered on a second position in the next frame, selecting a region of which the size is identical with that of the region where the object is located, comparing a color image of the selected region with the color image of the region where the object is located for a degree of similarity, and defining the position of the selected region of which the degree of similarity is higher than a certain threshold as the position of the object in the next frame; for example, defining the selected region with the highest degree of similarity as the position of the object in the next frame; wherein the position of the second position in the next frame is identical with that of the first position in the current frame.

Wherein, the color image of each frame can be acquired together with the depth image of each frame. The position is predicted using the texture and color information of the object; therefore, the prediction result is more accurate compared with that of using position information only. Moreover, the accuracy of the prediction result is further improved by predicting based on the size of the object region compared with that of predicting based on the size of a fixed region.

The second method comprises: computing to obtain the speed and direction of the object in a current frame according to the position of the detected object in the current frame and the position of the object in a previous frame, and computing to obtain the position of the object in the next frame according to the position of the object in the current frame and the speed and direction of the object in the current frame. The position information of the object is only used in this method.

207: storing the position information of the detected object in each frame in steps 201-205 in a second set as an element.

It should be noted that the sequence of the step 206 and step 207 is not limited.

208: associating the elements in the first set and the elements in the second set to form trajectories.

1) In the case of increasing or updating of the trajectory normally:

for a first element in the first set, when a second element of which the position information matches that of the first element within a preset range is found in the second set, the second element is added to the trajectory.

2) In the case of missed detection:

for a first element in the first set, when a second element of which the position information matches that of the first element within a preset range is not found in the second set, the first element is added to the trajectory.

After the first element is added to the trajectory, further increasing a mark value of the trajectory, for example, adding 1 to the mark value of the trajectory, and ending the trajectory when the mark value of the trajectory is greater than a preset threshold.

3) In the case of initiation of the trajectory:

for a third element in the second set, when a fourth element, of which the position information matches that of the third element within a preset range, is not found in the first set, the third element is added to a new trajectory.

In the case of false detection: after the third element is added to a new trajectory, further setting up the state of the new trajectory as non-active, and when the number of elements in the new trajectory is greater than a preset threshold, the state of the new trajectory is set up as active.

Figure 3:
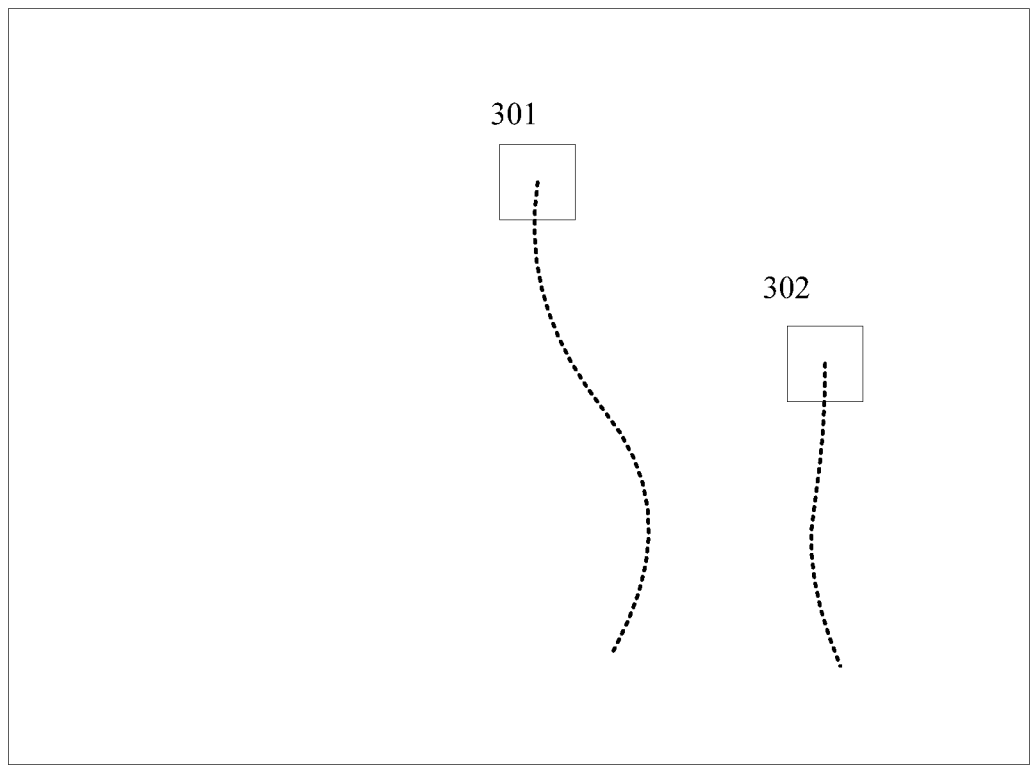
FIG. 3 shows a schematic diagram of detection of trajectories in another embodiment of the present invention.

In the above mentioned method of trajectory forming, the detection results of the frames can be simply and effectively associated, and cases of missed detection and false detection can be reduced to a certain degree. The trajectories of multiple objects can be effectively generated. The trajectories can be displayed after being formed. FIG. 3 shows a schematic diagram of detection trajectories, wherein the trajectories corresponding to different objects can be provided with different marks when displayed. In addition, the trajectories corresponding to different objects can be displayed using different colors, for example, the trajectory with the mark 301 can be displayed with the red color, while the trajectory with the mark 302 can be displayed with the green color.

209: defining the number of trajectories as the number of objects.

In the present embodiment, the objects are detected according to the depth image, the identical object in different frames is associated to form a trajectory and the number of objects is determined according to the number of trajectories. The depth data are highly consistent and are not easily affected by the environment, therefore counting objects based on the depth data ensures a more stable and accurate detection result. In addition, the position is predicted using the texture and color information of the object; therefore, the prediction result is more accurate compared with that of predicting the position using the position information only.

Figure 4:
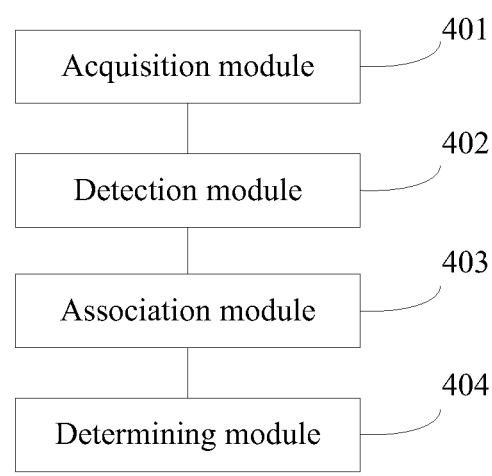
FIG. 4 shows a structural diagram of a device for objects counting provided in another embodiment of the present invention.

Referring to FIG. 4, a device for objects counting is also provided with the present embodiments. The device comprises:

an acquisition module 401 for acquiring the depth image of any one frame;

a detection module 402 for detecting objects according to the depth image;

an association module 403 for associating the identical object in different frames to form a trajectory; and a determining module 404 for determining the number of objects according to the number of trajectories.

Figure 5:
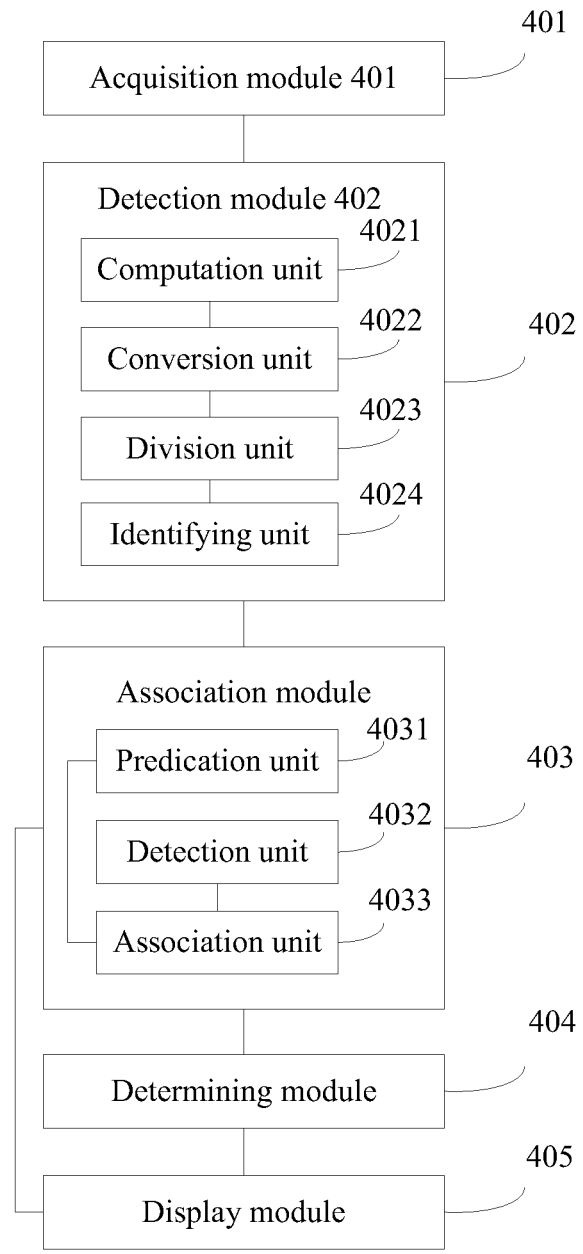
FIG. 5 shows another structural diagram of a device for objects counting provided in another embodiment of the present invention.

As shown in FIG. 5, in another embodiment, the detection module 402 comprises:

a computation unit 4021 for computing the distance from the camera to the ground according to the depth image;

a conversion unit 4022 for converting the depth image into a height image starting from the ground according to the distance;

a division unit 4023 for performing threshold division on the height image to obtain at least one foreground region set;

an identifying unit 4024 for identifying objects from the at least one foreground region set according to a preset reference region.

In another embodiment, the division unit 4023 is specifically used for:

setting a threshold for dividing an image, defining the regions in the height image of which the height is greater than or equal to said threshold as the foreground regions, and forming said foreground regions to a foreground region set.

The identifying unit 4024 is specifically used for:

selecting at least one foreground region from the foreground region set according to the size and contour of the reference region, defining the selected at least one foreground region as the object, wherein the difference between each of the selected at least one foreground region and the reference region is smaller than or equal to a preset range.

In another embodiment, the division unit 4023 is specifically used for:

setting a first threshold and a second threshold for dividing an image, defining the regions in the height image of which the height is greater than or equal to the first threshold as the first foreground regions, forming the first foreground regions to a first foreground region set, defining the regions in the height image of which the height is greater than or equal to the second threshold as the second foreground regions, and forming the second foreground regions to a second foreground region set.

The identifying unit 4024 is specifically used for:

selecting at least one foreground region from the first foreground region set and the second foreground region set according to the size and contour of the reference region, defining the selected at least one foreground region as the object, wherein the difference between each of the selected at least one foreground region and the reference region is smaller than or equal to a preset range, whereby when a foreground region from the first foreground set and a foreground region from the second foreground set are at the same position and the difference between each of both foreground regions and the reference region is smaller than or equal to a preset range, and selecting the foreground region that has the least difference from the reference region and defining the selected foreground region as the object.

In another embodiment, when the selected at least one foreground region includes a plurality of objects, before defining the selected at least one foreground region as the object, the identifying unit 4024 is also used for:

for each pixel in the at least one foreground region, in a preset window centered on the pixel, computing a mean height value of each pixel in the window, moving the center of the window to the position of the mean height value, repeating the computation and movement processes until the mean height value of the window at the current position is equal to that of the window at the previous position, and defining the current position of the window as the position of an object;

wherein, the computation and movement processes are used for computing the mean height value of each pixel in the window and moving the center of the window to the position of the mean height value.

In another embodiment, the association module 403 comprises:

a predication unit 4031 for predicting the position of the object in each frame, and storing the predicated position information of the object in each frame in a first set as an element;

a detection unit 4032 for storing the position information of the detected object in each frame in a second set as an element; and an association unit 4033 for associating the elements in the first set and the elements in the second set to form trajectories.

In another embodiment, when predicting the position of the object in each frame, the prediction unit 4031 is specifically used for:

based on the first position of the detected object in the current frame, in a preset range centered on a second position in the next frame, selecting a region of which the size is identical with that of the region where the object is located, comparing the color image of the selected region with the color image of the region where the object is located for the degree of similarity; and defining the selected region of which the degree of similarity is higher than a certain threshold as the position of the object in the next frame;

wherein, the position of the second position in the next frame is identical with that of the first position in the current frame.

In another embodiment, the association unit 4033 is specifically used for:

for a first element in the first set, when a second element of which the position information matches that of the first element within a preset range is found in the second set, adding the second element to the trajectory, when the second element of which the position information matches that of the first element within a preset range is not found in the second set, adding the first element to the trajectory;

for a third element in the second set, when a fourth element of which the position information matches that of the third element within a preset range is not found in the first set, adding the third element to a new trajectory.

In another embodiment, after adding the first element into the trajectory, the association unit 4033 is also used for:

increasing the mark value of the trajectory, and ending the trajectory when the mark value of the trajectory is greater than a preset threshold.

In another embodiment, after adding the third element into a new trajectory, the association unit 4033 is also used for setting up the state of the new trajectory as non-active, when the number of elements in the new trajectory is greater than a preset threshold, setting up the state of the new trajectory as active.

In another embodiment, the device also comprises a display module 405 for displaying the trajectories corresponding to different objects using different colors.

In the present embodiment, the objects are detected according to the depth image, the identical object in different frames is associated to faun a trajectory and the number of trajectories is determined according to the number of objects. The depth data are highly consistent and are not easily affected by the environment, therefore counting objects based on the depth data ensures a more stable and accurate detection result. In addition, the position is predicted using the texture and color information of the object, therefore the prediction result is more accurate compared with that of predicting the position using the position information only.

Those skilled in this field are clear that the above mentioned embodiments are intended for description only; and the division of the units/modules is a logical function only, and can be realized by other means in actual application. For example, the functional units/modules may individually exist, or all may be integrated in one processing unit/module, or may be integrated in one unit/module two by two. The above mentioned integrated units/modules can be realized by hardware and software.

Those ordinarily skilled in this field can understand that all or part of the steps for realizing the above mentioned embodiments can be completed by hardware or by the related hardware under the direction of a program; said program can be stored in a readable memory media which may be a ROM, a disc or an optical disc.

The above mentioned descriptions are exemplary embodiments of the present invention, which cannot limit the present invention. Within the spirit and principle of the present invention, any modification, equivalent substitution or improvement all shall be included in the protection scope of the present invention.

What is claimed is:

1. A method for objects counting, comprising:
   acquiring a depth image of any one frame;
   detecting objects according to said depth image wherein said detecting objects according to said depth image comprises:
   computing a distance from a camera to ground according to said depth image;
   converting said depth image into a height image starting from the ground according to said distance;
   performing threshold division on said height image to obtain at least one foreground region set by setting a first threshold and a second threshold for dividing the image, defining regions in the height image of which the height is greater than or equal to said first threshold as first foreground regions, forming said first foreground regions to a first foreground region set, defining regions in the height image of which the height is greater than or equal to said second threshold as second foreground regions, and forming said second foreground regions to a second foreground region set; and
   identifying objects from said at least one foreground region set according to a preset reference region by selecting at least one foreground region from said first foreground region set and said second foreground region set according to a size and contour of said reference region, defining said selected at least one foreground region as an object, wherein a difference between each of said selected at least one foreground region and said reference region is smaller than or equal to a preset range, whereby when a foreground region from said first foreground set and a foreground region from said second foreground set are at the same position and a difference between each of both foreground regions and said reference region is smaller than or equal to a preset range selecting the foreground region that has the least difference from said reference region and defining said selected foreground region as the object;
   associating an identical object in different frames to form a trajectory; and
   determining a number of objects according to the number of trajectories.

2. The method according to claim 1, wherein said performing threshold division on said height image to obtain at least one foreground region set comprises:
   setting a threshold for dividing an image, defining the regions in the height image of which the height is greater than or equal to said threshold as the foreground regions, forming said foreground regions to a foreground region set;
   said identifying objects from said at least one foreground region set according to a preset reference region further comprises:
   selecting at least one foreground region from said foreground region set according to a size and contour of said reference region, defining said selected at least one foreground region as the object, wherein a difference between each of said selected at least one foreground region and said reference region is smaller than or equal to a preset range.

3. The method according to claim 2, wherein when said selected at least one foreground region includes a plurality of objects, before defining said selected at least one foreground region as the object, said method further comprises:
   for each pixel in said at least one foreground region, in a preset window centered on the pixel, computing a mean height value of each pixel in said window, moving a center of said window to the position of the mean height value, repeating the computation and movement processes until the mean height value of said window at the current position is equal to that of said window at a previous position, defining a current position of said window as the position of an object;
   wherein, said computation and movement processes are used for computing the mean height value of each pixel in said window and moving the center of said window to the position of the mean height value.

4. The method according to claim 1, wherein said associating the identical object in different frames to form a trajectory comprises:
   predicting a position of the object in each frame, and storing predicated position information of the object in each frame in a first set as an element;
   storing the position information of the detected object in each frame in a second set as an element; and
   associating the elements in said first set and the elements in said second set to form trajectories.

5. The method according to claim 4, wherein said predicting the position of the object in each frame comprises:
   based on a first position of the detected object in the current frame, in a preset range centered on a second position in the next frame, selecting a region of which a size is identical with that of the region where said object is located, comparing a color image of the selected region with a color image of the region where said object is located for a degree of similarity; and
   defining the selected region of which the degree of similarity is higher than a certain threshold as the position of said object in the next frame;
   wherein, the position of said second position in said next frame is identical with that of said first position in said current frame.

6. The method according to claim 4, wherein said associating the elements in said first set and the elements in said second set to form trajectories comprises:
   for a first element in said first set, when a second element of which the position information matches that of said first element within a preset range is found in said second set, adding said second element to the trajectory, and when said second element of which the position information matches that of said first element within a preset range is not found in said second set, adding said first element to said trajectory; and
   for a third element in said second set, when a fourth element of which the position information matches that of said third element within a preset range is not found in said first set, adding said third element to a new trajectory.

7. The method according to claim 6, wherein after said adding said first element to said trajectory, said method further comprises:
increasing a mark value of said trajectory, and ending said trajectory when the mark value of said trajectory is greater than a preset threshold.

8. The method according to claim 6, wherein after said adding said third element to a new trajectory, said method further comprises:
setting up a state of said new trajectory as non-active, and when the number of elements in said new trajectory is greater than a preset threshold, setting up the state of said new trajectory as active.

9. The method according to claim 1, wherein after said associating the identical object in different frames to form a trajectory, said method further comprises:
displaying the trajectories corresponding to different objects using different colors.

10. A non-transitory storage device for objects counting, comprising:
an acquisition module for acquiring a depth image of any one frame;
a detection module for detecting objects according to said depth image, said detection module comprising:
a computation unit for computing a distance from a camera to ground according to said depth image;
a conversion unit for converting said depth image into a height image starting from the ground according to said distance;
a division unit for performing threshold division on said height image to obtain at least one foreground region set, wherein said division unit being configured to:
set a first threshold and a second threshold for dividing an image, define regions in the height image of which a height is greater than or equal to said first threshold as first foreground regions, form said first foreground regions to a first foreground region set, define the regions in the height image of which the height is greater than or equal to said second threshold as second foreground regions, and form said second foreground regions to a second foreground region set;
an identifying unit for identifying objects from said at least one foreground region set according to a preset reference region, said identifying unit being configured to:
select at least one foreground region from said first foreground region set and said second foreground region set according to a size and contour of said reference region, and define said selected at least one foreground region as an object, wherein the difference between each of said selected at least one foreground region and said reference region is smaller than or equal to a preset range, whereby when a foreground region from said first foreground set and a foreground region from said second foreground set are at the same position and a difference between each of both foreground regions and said reference region is smaller than or equal to a preset range, selecting the foreground region that has the least difference from said reference region and defining said selected foreground region as the object;
an association module for associating the identical object in different frames to form a trajectory; and
a determining module for determining the number of objects according to the number of trajectories.

11. The device according to claim 10, wherein said division unit is configured to: set a threshold for dividing image, define the regions in the height image of which a height is greater than or equal to said threshold as the foreground regions, and form said foreground regions to a foreground region set;
said identifying unit being configured to:
select at least one foreground region from said foreground region set according to a size and contour of said reference region, and define said selected at least one foreground region as the object, wherein the difference between each of said selected at least one foreground region and said reference region is smaller than or equal to a preset range.

12. The device according to claim 11, wherein when said selected at least one foreground region includes a plurality of objects, before defining said selected at least one foreground region as the object, said identifying unit being configured to:
for each pixel in said at least one foreground region, in a preset window centered on the pixel, compute a mean height value of each pixel in said window, move a center of said window to the position of the mean height value, repeat the computation and movement processes until the mean height value of said window at the current position is equal to that of said window at a previous position, and define a current position of said window as the position of an object;
wherein, said computation and movement processes are used for computing the mean height value of each pixel in said window and moving the center of said window to the position of the mean height value.

13. The device according to claim 10, wherein said association module comprises:
a prediction unit for predicting a position of the object in each frame, and storing predicted position information of the object in each frame in a first set as an element;
a detection unit for storing the position information of the detected object in each frame in a second set as an element; and
an association unit for associating the elements in said first set and the elements in said second set to form trajectories.

14. The device according to claim 13, wherein when predicting the position of the object in each frame, said prediction unit being configured to:
based on the first position of the detected object in the current frame, in a preset range centered on a second position in the next frame, select a region of which a size is identical with that of a region where said object is located, compare a color image of the selected region with a color image of the region where said object is located for a degree of similarity; and
define the selected region of which the degree of similarity is higher than a certain threshold as the position of said object in the next frame;
wherein, the position of said second position in said next frame is identical with that of said first position in said current frame.

15. The device according to claim 13, wherein said association unit being configured to:
for a first element in said first set, when a second element of which the position information matches that of said first element within a preset range is found in said second set, add said second element to the trajectory, when said second element of which the position information matches that of said first element within a preset range is not found in said second set, and add said first element to said trajectory; and for a third element in said second set, when a fourth element of which the position information matches that of said third element within a preset range is not found in said first set, add said third element to a new trajectory.

16. The device according to claim 15, wherein after said add of said first element to said trajectory, said association unit being configured to:
increase a mark value of said trajectory, and end said trajectory when the mark value of said trajectory is greater than a preset threshold.

17. The device according to claim 15, wherein after said add of said third element to a new trajectory, said association unit being configured to:
set up a state of said new trajectory as non-active, and when the number of elements in said new trajectory is greater than a preset threshold, set up the state of said new trajectory as active.

18. The device according to claim 10, wherein said device further comprises:
a display module for displaying the trajectories corresponding to different objects using different colors.

19. A method for objects counting, comprising:
acquiring a depth image of any one frame;
detecting objects according to said depth image wherein said detecting objects according to said depth image comprises:
computing a distance from a camera to ground according to said depth image;
converting said depth image into a height image starting from the ground according to said distance;
performing threshold division on said height image to obtain at least one foreground region set by setting a threshold for dividing an image, defining the regions in the height image of which the height is greater than or equal to said threshold as the foreground regions, forming said foreground regions to a foreground region set; and
identifying objects from said at least one foreground region set according to a preset reference region by selecting at least one foreground region from said foreground region set according to a size and contour of said reference region, defining said selected at least one foreground region as the object, wherein a difference between each of said selected at least one foreground region and said reference region is smaller than or equal to a preset range, wherein when said selected at least one foreground region includes a plurality of objects, before defining said selected at least one foreground region as an object, said method further comprises:
for each pixel in said at least one foreground region, in a preset window centered on the pixel, computing a mean height value of each pixel in said window, moving a center of said window to a position of the mean height value, repeating the computation and movement processes until the mean height value of said window at a current position is equal to that of said window at a previous position, defining a current position of said window as the position of an object wherein, said computation and movement processes are used for computing the mean height value of each pixel in said window and moving the center of said window to the position of the mean height value;

associating an identical object in different frames to form a trajectory; and determining a number of objects according to the number of trajectories.

* * * * *